M. A. ROSS.
ROLLER BEARING.
APPLICATION FILED AUG. 5, 1913.
1,118,685.
Patented Nov. 24, 1914.
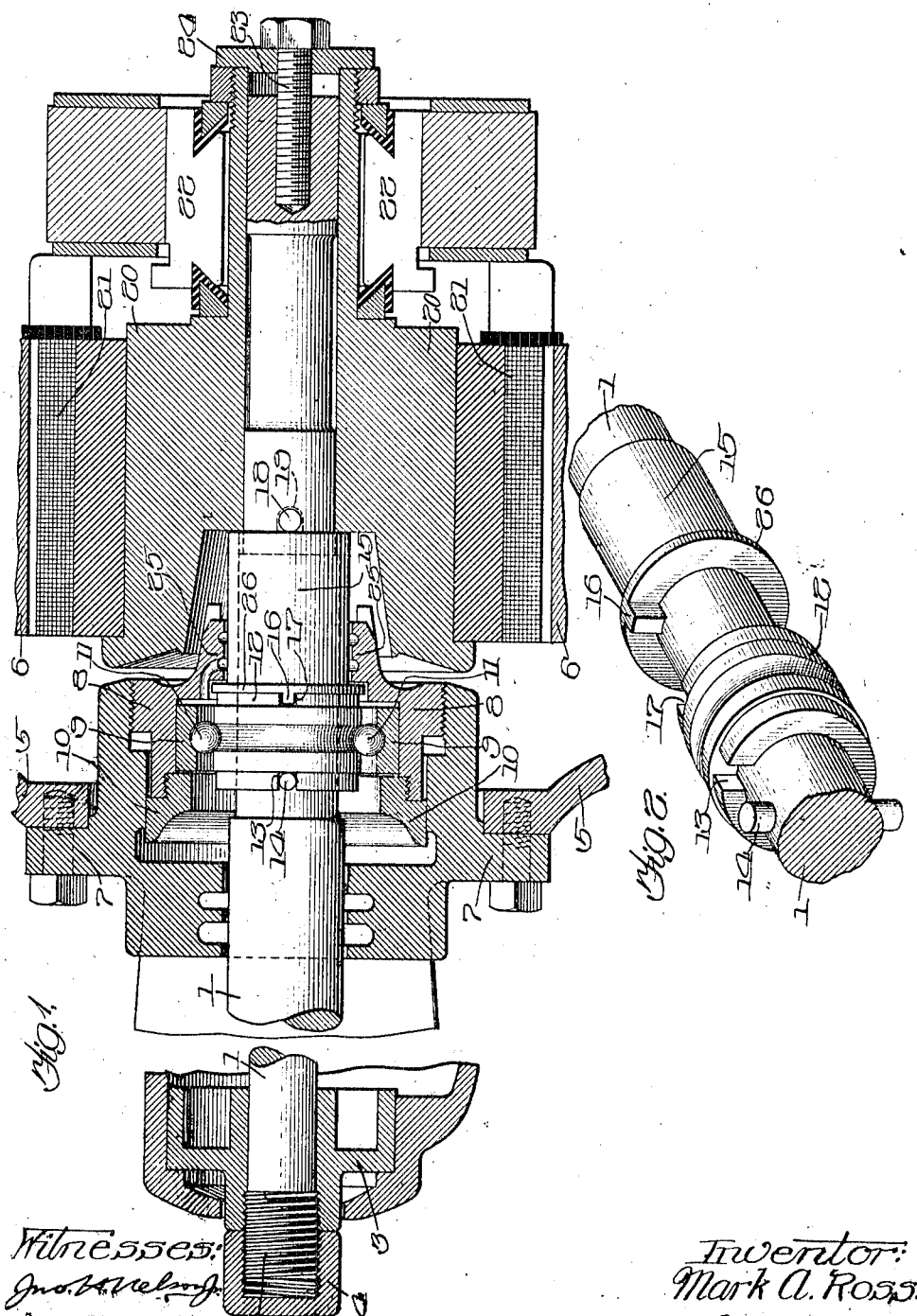

UNITED STATES PATENT OFFICE.

MARK A. ROSS, OF CHICAGO, ILLINOIS.

ROLLER-BEARING.

1,118,685.

Specification of Letters Patent.

Patented Nov. 24, 1914.

Application filed August 5, 1913. Serial No. 783,071.

*To all whom it may concern:*

Be it known that I, MARK A. Ross, citizen of the United States, residing at Chicago, in the county of Cook and State of Illinois, have invented a certain new and useful Improvement in Roller-Bearings, of which the following is a full, clear, concise, and exact description, reference being had to the accompanying drawings, forming a part of this specification.

My invention relates to power transmission mechanism and particularly to that class of power transmission mechanism in which transmission shafts are supported by roller bearings which may be either of the cylinder, ball, conical or other type.

The invention has for one of its objects the provision of a construction wherein the inner race-way wall of the bearing may be in key connection with the shaft it supports but which key connection is of such construction that it will permit of the withdrawal of the shaft through said inner race-way wall while permitting said inner race-way wall to remain in its location. By this arrangement the adjustment of the bearing, having once been secured, need not be disturbed when the shaft is withdrawn and inserted.

In accomplishing another object of the invention, whether or not the construction be adapted to fulfill the first object of the invention, the outer race-way wall has sliding engagement at its periphery with the support for the roller bearing structure so that when the shaft is thrust longitudinally of itself the two race-way walls will move therewith, and I provide a stop for limiting the thrusting movement of the shaft, this stop being carried by the support for the bearing structure and being constructed to engage the inner race-way wall before the outer race-way wall can engage such support. In the preferred embodiment of the invention the engagement which this stop has with the inner race-way wall is indirect, a distant preserving sleeve desirably having a portion interposed between the stop and inner race-way wall.

The device of my invention is of particular service in the construction of those small power plants which are carried by locomotives for the purpose of generating electricity to operate locomotive lights, and which small power plants frequently include steam turbines for driving the generators. The shafts which are common to the turbines and generators are desirably limited from thrusting movement in one direction by a stop engaging one end of the shaft and, in accordance with my invention, are limited to thrusting movement in the reverse direction by the stop having limiting engagement with the inner race-way wall. The invention, however, is not to be limited to this adaptation thereof.

I will explain my invention more fully by reference to the accompanying drawings in which—

Figure 1 is a longitudinal sectional view showing as much of the invention as is necessary to an understanding thereof and Fig. 2 is a perspective view of some of the parts in separated relation.

Like parts are indicated by similar characters of reference throughout the different figures.

The power transmission shaft 1 is driven by some suitable form of prime mover such as a steam turbine and preferably has a stop for limiting its movement toward the left, which stop includes a screw plug 2 screwed into the end of a bearing 3 so as to have engagement with the corresponding end of the shaft, a nut 4 being screwed upon the stop 2 and into engagement with the bearing 3 to secure the adjustment of said stop. The shaft 1 is supported at the load end thereof by a bearing support 5 which also, in this instance, carries the field 6 of the generator. The bearing support 5 includes in its formation a central element 7 having a sleeve portion in threaded connection with a ball bearing cup 8 in which the outer race-way wall 9 is received and which race-way wall may be moved longitudinally of and upon said cup. The race-way wall 9 is disposed within an annular channel formed in part by means of a retaining ring 10 screwed into the cup 8. Balls 11 intervene between the outer race-way wall 9 and the inner race-way wall 12, the shaft thus having ball bearing support. The left hand end of the inner race-way wall 12 is extended to the left beyond the plane of the outer race-way wall and there are formed in this extended portion of the inner race-way wall slots 13 which are open at the left hand end of the inner race-way wall so as to receive the projecting ends of a key 14 carried by the shaft when the shaft is thrust toward the right through the wall 12. A distance preserving sleeve 15 is located upon the right of the inner race-way wall 12 and carries diametrically opposite lugs 16 which enter diametrically opposite slots or notches 17 in the inner race-way wall. The other end of the distance preserving sleeve 15 is engaged with a key 18 projecting through the shaft, this key 18 being received in diametrically opposite notches or slots 19 provided in a spider 20 which carries the armature 21 and commutator 22 of the generator. A cap bolt 23 and a coöperating washer 24 serve to clamp the spider 20 against the key 18. When the parts are to be disassembled the screw cap 23 is loosened, the armature and its supporting spider are withdrawn, the key 18 is removed, and thereafter, the shaft 1 is drawn to the left, the key 14 being of such short length that it may readily pass through the circular orifices which surround the shaft and through which the shaft is pulled when it is withdrawn. When the parts are to be assembled the shaft is inserted from the left hand end of the outfit and is peripherally adjusted until the key 14 engages the notches or slots 13. The assembler will turn the distance preserving sleeve until the inner race-way wall is in position to engage the key upon the shaft whereupon the sleeve is moved longitudinally of the shaft to effect the engagement of the shaft key and inner race-way wall. He will know that the key 14 is in engagement with the notches 13 when the aperture in the shaft that receives the key 18 is uncovered by the sleeve 15. The balance of the assembly is, of course, understood. By the construction thus far specifically described the inner race-way wall is positively secured against rotary movement with respect to the shaft while at the same time the removal of the shaft through the race-way wall is readily permitted without disturbing the adjustment of the bearing. Hitherto, in constructions of this class, the inner race-way wall was held against rotation merely by having its end faces held in clamping engagement, the advantage then sought being to secure the withdrawal of the shaft without disturbing the adjustment of the bearings. In such prior constructions, however, the clamping engagement with the inner race-way wall rapidly deteriorated owing to the expansion of the shaft due to heat, subsequent contraction, and resulting looseness with a train of disadvantages that will be apparent to those skilled in the art.

When the power plants are carried upon violently jolting vehicles such as locomotives, the shafts are likely to sudden movement which are desirably limited to one direction by fixed stops such as shown at 2. Hitherto the movement of the shafts in the other direction was limited by the balls of the bearing, the outer race-way walls having hitherto been fixed upon their supports while the inner race-way walls were fixed with respect to their shafts. In accordance with my invention the outer race-way wall is permitted slight movement upon the inner surface of the cup 8 so that when the shaft is subject to thrusting movement toward the right the outer race-way wall will move with the shaft as well as the inner race-way wall, but in order to prevent the outer race-way wall from engaging, at its right hand face, with the cup 8, this cup is provided with an insetting projection 25 which serves to stop the movement of the shaft by engaging the inner race-way wall through the intermediation of an outsetting flange 26 upon the left hand end of the distance preserving sleeve 15, the clearance between the stop 25 and the flange 26 being less than the clearance between the right hand face of the outer race-way wall 9 and the cup 8. Owing to the presence of a stop 2 which limits the movement of the shaft in one direction, I have provided but one stop 25 which is for the purpose of taking up the movement of the shaft in the other direction, though I do not wish to be limited to the presence of one such stop 25. This stop 25 is desirably annular so as to have uniform engagement with the flange 26 throughout its circle.

While I have herein shown and particularly described the preferred embodiment of my invention I do not wish to be limited to the precise details of construction shown as changes may readily be made without departing from the spirit of the invention, but

Having thus described my invention, I claim as new and desire to secure by Letters Patent the following:—

1. Power transmitting means, including a shaft; a roller bearing therefor having inner and outer race-way walls with rolling elements between; a key carried by the shaft, the inner race-way wall being notched upon one of its end faces there to receive the key to hold the inner race-way wall and shaft together and permitting withdrawal of the key by longitudinal movement of the key carrying shaft away from the roller bearing; and a distance preserving portion engaging the other end face of the inner race-way wall, the engaging portions of the inner race-way wall and the distance preserving portion insetting, one in the other.

2. Power transmitting means including a shaft; a roller bearing therefor having an inner race-way wall normally fixed upon the shaft and an outer race-way wall with rolling elements between the race-way walls; a support for the outer race-way wall upon which said wall may slide longitudinally of the shaft; a stop carried by said support operating to limit thrusting movement of the shaft through the intermediation of the inner race-way wall and a distance preserving sleeve taking part in positioning the inner race-way wall upon the shaft and through which the stop operates to limit the thrusting movement of the shaft.

In witness whereof, I hereunto subscribe my name this twenty-eighth day of July A. D., 1913.

MARK A. ROSS.

Witnesses:
G. L. CRAGG,
ETTA L. WHITE.